United States Patent
Blersch et al.

(10) Patent No.: US 9,835,246 B2
(45) Date of Patent: Dec. 5, 2017

(54) CONTROL PLATE

(71) Applicant: REINZ-DICHTUNGS-GMBH, Neu-Ulm (DE)

(72) Inventors: Robert Blersch, Baltringen (DE); Georg Egloff, Weissenhorn (DE); Oliver Claus, Laichingen (DE); Viktor Hibert, Laupheim (DE); Hans Waldvogel, Krumbach (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 3 days.

(21) Appl. No.: 14/392,044

(22) PCT Filed: Dec. 2, 2013

(86) PCT No.: PCT/EP2013/075220
§ 371 (c)(1),
(2) Date: May 7, 2015

(87) PCT Pub. No.: WO2014/083199
PCT Pub. Date: Jun. 5, 2014

(65) Prior Publication Data
US 2015/0247567 A1  Sep. 3, 2015

(30) Foreign Application Priority Data
Nov. 30, 2012 (DE) .................... 20 2012 011 555 U

(51) Int. Cl.
*F16J 15/12* (2006.01)
*F16J 15/10* (2006.01)
*F16H 61/00* (2006.01)
*F16J 15/02* (2006.01)

(52) U.S. Cl.
CPC .......... *F16H 61/0009* (2013.01); *F16J 15/02* (2013.01); *Y10T 74/20024* (2015.01)

(58) Field of Classification Search
CPC ...... F16J 15/08; F16J 15/0806; F16J 15/0818; F16J 15/085; F16J 15/0856; F16J 15/0881; F16H 61/0009; Y10T 74/20024
See application file for complete search history.

(56) References Cited

U.S. PATENT DOCUMENTS 5,722,456 A * 3/1998 Schumacher ........ B01D 29/012
                                                137/550
5,852,957 A    12/1998 Saito
6,073,938 A     6/2000 Abe et al.

FOREIGN PATENT DOCUMENTS

| DE | 69509746 T2 | 9/1999 |
|---|---|---|
| DE | 102007040101 A1 | 2/2009 |
| DE | 202011103429 U1 | 7/2012 |
| EP | 0259794 A2 | 3/1988 |
| EP | 0733833 A1 | 9/1996 |
| EP | 0921333 A1 | 6/1999 |
| JP | 6109138 A | 4/1994 |
| JP | 2001295929 A | 10/2001 |
| WO | 2008135133 A1 | 11/2008 |

* cited by examiner

*Primary Examiner* — Gilbert Y Lee
(74) *Attorney, Agent, or Firm* — Marshall & Melhorn, LLC

(57) ABSTRACT

The present invention relates to a control plate as it is for instance used in pneumatic or hydraulic controls. An example of such a control plate is a transmission control plate with which automatic transmissions are controlled hydraulically.

16 Claims, 7 Drawing Sheets

D-D

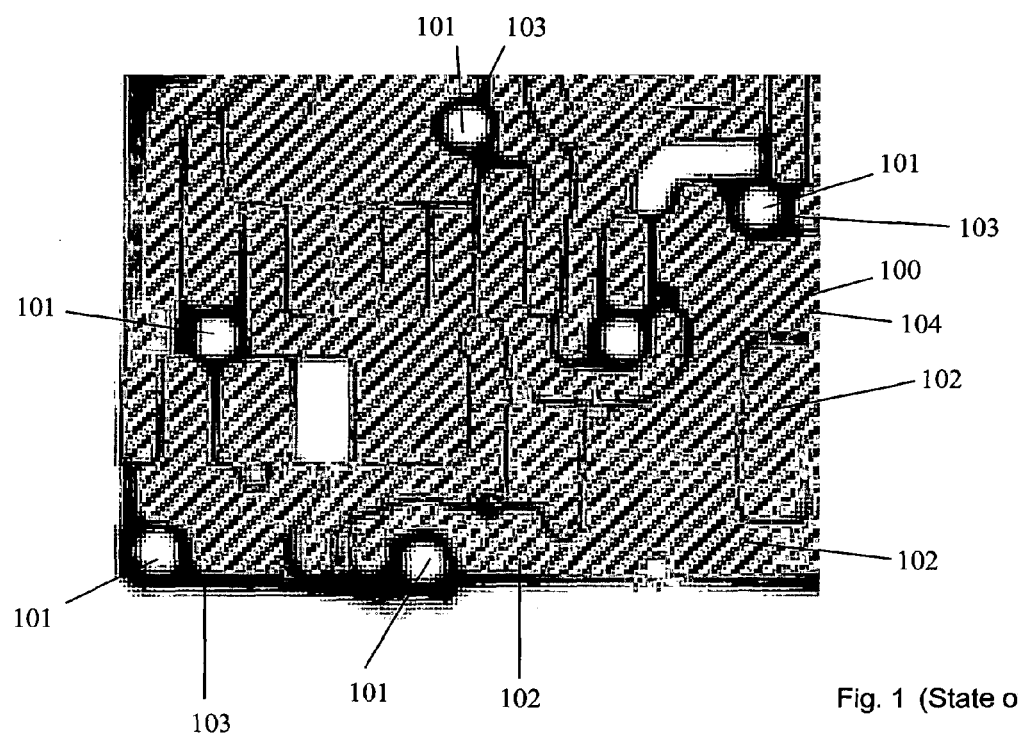
Fig. 1 (State of the art)
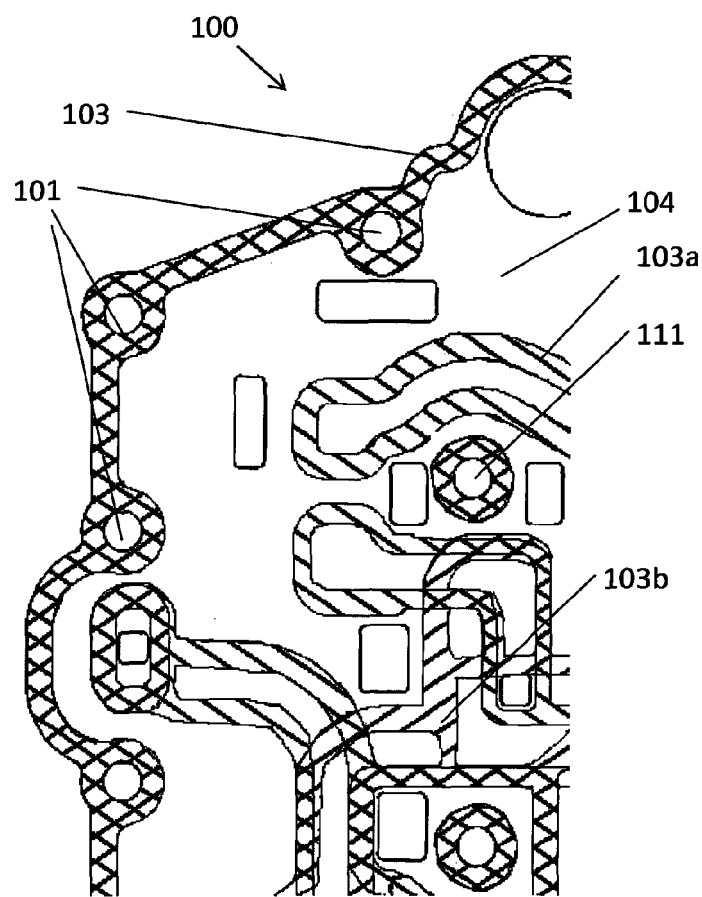
Fig. 2

Fig. 5 (Section A-A)

Fig. 6 (Section B-B)

CONTROL PLATE

BACKGROUND OF THE INVENTION

The present invention relates to a control plate as it is for instance used in pneumatic or hydraulic controls. An example of such a control plate is a transmission control plate with which automatic transmissions are controlled hydraulically.

Control plates often comprise a metallic layer, which comprises passage openings for the hydraulic fluid, e.g. oil. This layer—often also referred to as distance layer or carrier layer—typically has a thickness of about 1 mm or more. Adjacent to this metallic layer, valve housings are arranged by means of which the flow of the hydraulic fluid is controlled.

In order to fulfil its control purpose, the hydraulic fluid flows in channels on surfaces of the respective parts of the transmission which are covered by the transmission plate. The transmission plate comprises a plurality of passage holes through which the hydraulic fluid can pass from one surface to the opposite one and continues to flow in another channel. Dependent on the operational state of the transmission, the hydraulic fluid flows with different velocities and pressures in different channels. Also dependent on the operational state, it shows no movement in some of the channels. As a consequence, these channels need to be sealed against each other, although the same hydraulic fluid is present in all of them. Further, the metallic layer needs to be sealed against the outside at its outer edge. Therefore, the oil passage openings individually or in groups, isolated or continuously with the channels opening to the respective oil passage openings need to be encircled by a sealing line which considers the pressure conditions in the hydraulic oil. Further, a sealing of the outer edge of the control plate, is required, too.

To this end, according to the state of the art, a coating is applied to the metallic layer at least in sections surrounding the openings, for example using screen printing. This coating shows an essentially uniform thickness. It consists of an elastomer which is compressed between the metallic layer and the adjacent part when the layer is compressed with the adjacent part during tightening of the screws and this ways provides for its sealing effect.

Such a partially coated layer is however related to the problem that the screw forces are introduced locally in the area of the screw holes, so that in the area around the screw holes high compression forces are present while in the areas in between the screw holes the compression forces are considerably smaller. This results in an imbalanced sealing effect of the coating. Moreover, there are situations where the compression must not be the same over the complete extension of the metallic layer, but in particular areas, a deliberately increased or reduced compression may be required.

In order to solve this problem, in the state of the art, additional active gasket layers are arranged next to the metallic layer—the distance layer. These gasket layers comprise additional sealing elements, e.g. embossed beads, which in particular extend around the oil-carrying passages to be sealed. Such sealing beads contribute additional compression forces to the regions around the areas to be sealed. In a similar manner, DE 10 2007 040 101 A1 proposes to provide for a step in the distance layer, which step surrounds the areas to be sealed. This leads to an increase of the compression in the area of the step and causes an improved sealing around a region to be sealed, such as an oil passage.

It is disadvantageous with these solutions that they either require additional layers or an additional forming of the distance layer for the improvement of the sealing effect.

BRIEF SUMMARY OF THE INVENTION

It is therefore the object of the present invention to enhance a conventional control plate in such a way that it provides for an improved sealing effect over its entire extension. Such an improved control plate shall guarantee for a reliable sealing without additional production steps or additional components.

This object is solved by the control plate according to claim 1. Advantageous embodiments of the control plate according to the invention are given in the dependent claims.

The present invention departs from a control plate which comprises at least one metallic layer. This metallic layer is coated at least in sections on at least one of its surface as is the case in the state of the art, too.

In contrast to conventional control plates with polymer-based coatings, which apart from edge-effects and variations of thickness due to production effects show a uniform thickness, the coating of the inventive control plate shows a topography of the thickness of the coating with different thicknesses at different areas of a continuously coated region. If nothing else is mentioned, the thickness of the coating is to be understood as the thickness of the coating in the non-compressed state of the control plate.

Advantageously, the present invention in particular relates to different areas of a continuously coated region, which show identical or essentially identical width. An identical or an essentially identical width means, that the widths of the areas considered show a difference of at the most 20%, preferably of at the most 10% and most preferably at the most 5% of the width of the thicker area.

During the production process of the control plate, especially during the coating process, it is possible that with a considerably different width of the coating, a smaller thickness is achieved in the center of a broader area compared to a smaller area. Such non-intentional deviations from the nominal thickness shall however not be covered by the invention.

The present invention thus mainly concerns areas, which have a comparable width. In particular, it does not relate to such areas of the coating, at which the coating branches and therefore shows a larger thickness in these areas, at least if it shows a sufficient distance from the closest bolt hole. Such broader areas are in particular areas in which the sealing lines branch off in a T-shaped manner. As far as such branched areas are sufficiently distanced from the closest bolt hole, the present invention makes no representation as to their thickness in comparison to other areas of the same continuous coating, if they show a smaller width. Sufficiently distanced from the closest bolt hole in this context means a distance between the outer contour of the broadened area of the coating considered and the closest bolt hole, which is larger than twice the diameter of the closest bolt hole.

The present invention thus in particular relates to areas of the coating, which belong to one and the same coating section with extends linearly and with regular width, but not particularly broadened areas such as T-areas with a large distance to a screw hole. However, if such broadened areas are given in close vicinity to a bolt hole, they can be included into the topographical design of the areas of a continuous coating according to the invention and thus be designed according to claim 1.

This makes it possible even with continuously coated regions to keep the coating smaller e.g. in the area around screw holes than in areas which are further away from the screw holes. If the thickness of the coating is increased in the latter areas, this thicker coating causes that the compression in these areas is increased and as a consequence, the compression of the entire control plate in its complete coated area becomes more equilibrated or can be deliberately designed at particular areas. Finally, the design of the topography of the coating allows for an equilibrated or deliberate distribution of the screw forces over a part or the entire area of the metallic layer.

Due to this, the tightness of the control plate can be generally increased and the control plate can be used for higher pressure differences in different channels on its surfaces.

With an equilibrated distribution of the screw forces to the entire control plate, the bracing of the parts to be sealed, which is introduced through the screw tightening into these parts, can be equilibrated. Given the equilibrated compression forces in the control plate and therefore the reduced compression pressures around the screw holes, the setting behavior in the areas around the screw holes is improved, too.

It is particularly advantageous, that with a tailored screen printing screen, the coating can be applied with different layer thicknesses in one single step over continuous areas. Therefore, no additional working steps area required for the application of the coating with purposeful deliberate individual profiling.

The control plate according to the invention makes it further possible to already assess the pressure forces to be expected as well as their distribution over the control plate. The thickness of the coating in the individual areas of the control plates can then be adapted accordingly. In particular, the thicknesses of the coating around the passage openings, e.g. around the screw holes, water holes, oil holes and the like can be individually adapted.

The present invention is particularly suited to be applied in a one-layered control plate. Such a one-layered control plate which comprises only one carrier layer without further functional layers has already been described for the state of the art.

Advantageously, both with one-layered and with multi-layered control plates, the coated surface of the metallic layer at least in the coated areas is completely flat, thus shows neither depressions nor protrusions relative to the surface of the layer surface. Completely flat is to be understood in such a manner that no deliberate depressions or protrusions are formed, but that warpage due to the cutting of holes or of the outer edges are possible. The usual surface roughness is of no meaning, neither. Without depressions or protrusions, and in view of the metallic nature of the layer, the layer is impermeable except where fluid passage holes and fastener holes are located.

Due to the profiling of the coating according to the invention further active layers, which for the improvement of the sealing effect comprise for instance beads, can be dispensed with. The coating which is profiled in the inventive manner in general suffices as the unique sealing means.

However, if a relative high total thickness of the control plate is required, it may be necessary to combine two metallic layers and to partially coat each of them on the surface pointing away from the respective other one. It is then preferred if both surfaces are coated with deliberately adapted coating heights.

The metallic carrier layer of a one-layered control plate as well as the metallic layers of a multi-layer control plate each individually or as a group can consist in carbon steel or stainless steel, preferably in spring-hard steel, most preferably in surface-treated stainless steel, especially in chromated, aluminium-plated or zinc-plated stainless steel, aluminium or an aluminium alloy or in deliberate combinations of the materials mentioned among them or with further, non-mentioned materials or can comprise them.

As coating materials, polymer-based coatings comprising one or several of the following materials or consisting in them are particularly suited: An elastomer, or a thermoset, in particular a fluorous polymer, e.g. fluoroelastomers (FPM) such as vinylidene fluoride-hexafluoropropylene copolymers, silicon rubbers, acryl-butadiene rubbers (NBR), hydrated acryl-butadiene rubbers (HNBR), polyurethane (PUR), natural rubber (NR), perfluoro-elastomers (FFKM), styrene-butadiene rubber (SBR), polybutadiene (BR), fluorosilicone rubber (FVMQ), chlorosulfonated polyethylene (CSM), ethylene propylene rubber (EPM), ethylene propylene diene rubber (EPDM), as well as silicon and/or epoxy resins or any mixtures of the aforementioned materials among themselves or with other materials which are not mentioned here.

The control plate according to the invention in the non-installed state advantageously shows a thickness of ≥0,175 mm and ≤2.0 mm, preferable of ≥0.4 mm and ≤1.2 mm per layer, without the thickness of the coating.

The thickness of the coating advantageously amounts to 30 to 60 μm in areas of reduced compression, 20 to 50 μm in transition areas and 10 to 35 μm in the area of high pressure, thus e.g. in the screw area.

Advantageously, the thickness of the coating varies in a continuous manner. The differences of the thickness between different areas of a continuously coated region with a continuous variation of their thickness advantageously changes by 12 μm, preferably by ≥15 μm on a distance of ≤100 mm, advantageously ≤80 mm, particularly advantageously ≤50 mm. As an alternative, the variation of the thickness between two areas of a continuously coated area advantageously is ≥10 μm, preferably ≥12 μm on a distance of ≤30 mm, preferably ≤20 mm.

The present invention relates to variations in the thickness of the polymer-based coating which extends between and distanced to the edges of this polymer-based coating and advantageously shows the values mentioned above. This means that the invention does not relate to variations in the thickness at the edge of a coated area, but only in its central area. The central area is to be understood as an area which is distanced to the neighboring edges of the coating by at least 10%, preferably by at least 20% and more preferably at least 30% of the minimum width of the polymer-based coating. For large coating areas, a distance of at least 0.8 mm from the neighboring edges of the coating has to be respected.

In the same way, the present invention does not relate to variations of the thickness which range within the measurement tolerance or the production tolerance. Such tolerances are typically ≤5 μm, preferably ≤4 μm, with the contribution of the production tolerances dominating. The present invention thus relates to a topographical design of continuously coated areas with variations in the thickness of the coating, which are larger than production tolerances and measurement tolerances and which result in a central area of the continuously coated region.

With control plates, the width of the sealing coatings in most areas are determined by the parts to be sealed and the channels comprised in them or the width results from a general minimum width. As a consequence, the sealing effect of the coating at most areas can only be equilibrated by a topographical design of the thickness of the coating. Only at few areas, it is thus possible to adapt the width of the coating to the pressure conditions. If a broader sealing lip is applied in such an area, this broader sealing lip compared to the smaller sealing lips at identical absolute compression forces can only be shifted aside to a smaller degree due to the smaller surface pressure. As a consequence, a larger effective thickness results after the compression of the sealing lip and therefore a larger pressure force.

BRIEF DESCRIPTION OF THE DRAWINGS

In the following, some examples for control plates according to the invention are given. The same or similar reference numbers are used for the same or similar elements. In the following examples, a plurality of characteristics is shown in a combined manner. Each individual one of these characteristics can however also serve as an embodiment of the present invention when regarded isolated from the respective example.

It is shown in

FIG. 1: A detail of a top-view of a control plate according to the state of the art;

FIG. 2: A transparent view through a control plate;

DETAILED DESCRIPTION OF THE INVENTION

Figure 3:
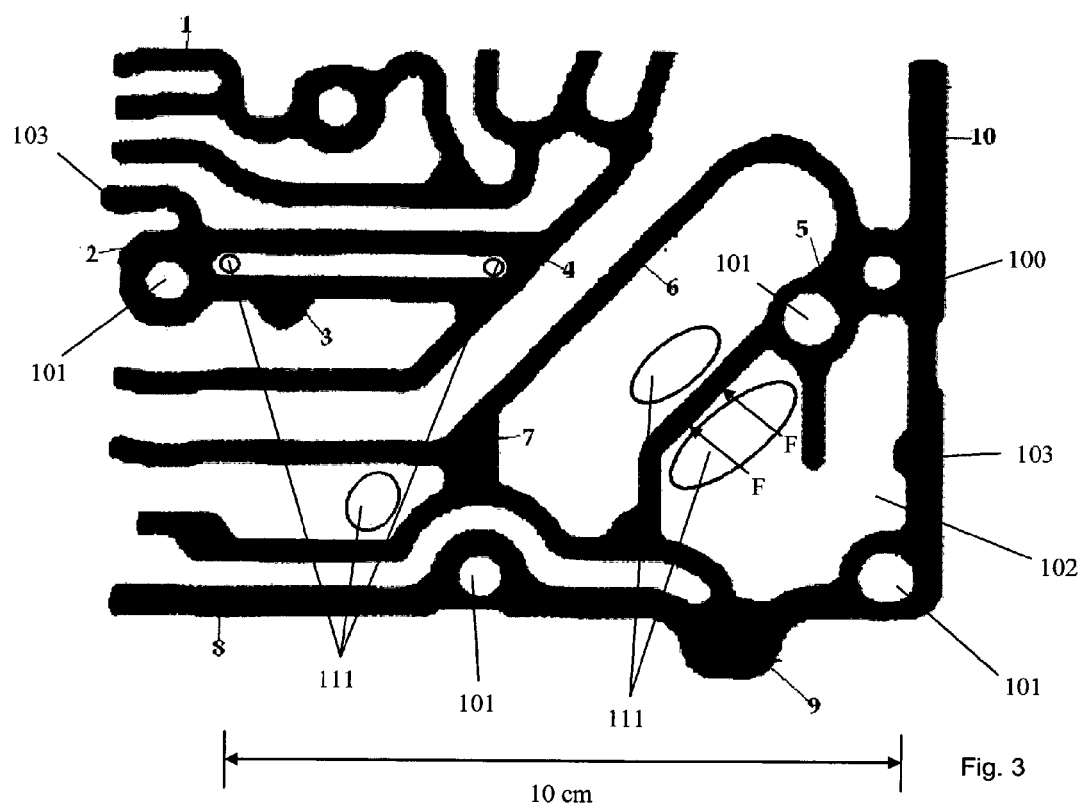
FIG. 3: A detail of a top-view of a coating of a control plate.

FIG. 1 shows a detail of a top-view of a conventional control plate 100. This control plate is a hydraulic transmission control plate. This transmission control plate comprises a metallic layer 104 with shows a distribution of coated areas 103. An elastomeric material is used as the coating material.

The areas 102 situated between the coated areas 103 are either openings 101 or non-coated areas 102. The openings referred to as 101 here are screw holes, where the compression forces are introduced into the transmission control plate 100 when the screws are tightened. In order to keep the drawing clear, a representation of the oil passage openings has been dispensed with.

In a control plate 100 of this state of the art, the coating of the coated areas 103 shows an identical thickness over the complete coated area apart from the lateral edge areas as well as from production and measurement variations. The representation of the coating here does however not only show the area of the coating but at the same time shows a print, which has been obtained using a pressure-sensitive film during the installation of the control plate 100. Pale areas of the continuous coating, thus of the sealing line, indicate areas of insufficient compression and therefore insufficient sealing. In contrast, dark sections of these coating lines, as they occur for instance in the vicinity of the screw holes 101 represent areas of high compression and therefore good local sealing.

Starting from this representation of the compression conditions, the local height of the coating is varied according to the invention, e.g. increased in insufficiently compressed areas and/or reduced in areas where the compression compared with other areas is too high, so that an equilibrated compression and therefore a good sealing effect is obtained for the entire control plate.

FIG. 2 indicates that the course of the two sealing coatings 103 on the opposite sides of the transmission control plate 100 show areas in which they run in parallel and may shows areas in which they extend independent of each other. The coating 103a on the surface pointing towards the spectator is indicated with a hatching that extends from the upper left to the lower right, the hatching extending from the upper right to the lower left indicates the coating 103b on the surface pointing away from the spectator. While in many areas, the coatings 103a and 103b overlap, which is indicated by a rhombic hatching pattern—resulting from the overlap of the two hatchings—there are some few areas in which one of the coatings 103a, 103b extends on its own. These areas may stand alone or continue into areas in which the other coating is present, too. As a consequence, there are junction and crossing areas in the transparent illustration. FIG. 2 can apply both to the state of the art and to the invention that will be described in the following. The two different courses of the coating can be present on the opposite surfaces of a single layer or of different layers of a transmission control plate 100.

FIG. 3 now shows a detail of a top view of the coating pattern of a transmission control plate 100 according to the invention. Here, only five representative oil passage openings 111 or to be more precise, their edges in a schematic representation, are shown. In order to keep the figure clear, an illustration of all oil passage openings has been dispensed with. In FIG. 3, a total of ten points 1 to 10 has been individually marked, at which the thickness of the coating according to the invention has been determined. In FIG. 3, two continuously coated areas are represented, the first one comprising points 1 to 4 and the second one comprising the points 5 to 10. Such continuously coated areas in the state of the art are produced with a constant thickness of the coating. In addition to these ten points, four equidistant points along the line F-F, thus within the second continuous sealing area mentioned above, have been considered in the middle of the respective sealing lip section, they are referred to as points 11 to 14, but are not marked individually in FIG. 3.

In the following table, the thicknesses measured at these points are represented:

| Table of values relating to FIG. 3 | |
|---|---|
| Measurement point | actual value [μm] |
| 1 | 18.3 |
| 2 | 21.8 |
| 3 | 19.4 |
| 4 | 33.3 |
| 5 | 18.9 |
| 6 | 29.6 |
| 7 | 28.0 |
| 8 | 27.3 |
| 9 | 14.7 |
| 10 | 31.6 |
| 11 | 27.6 |
| 12 | 26.3 |

-continued

Table of values relating to FIG. 3

| Measurement point | actual value [μm] |
|---|---|
| 13 | 27.1 |
| 14 | 27.2 |

In FIG. 3, points 2, 3, 5 and 9 are relatively close to the screw hole 101. At these areas, a relatively thin coating thickness—measured in the central area of the sealing lip—has been chosen. In contrast, the points 4, 6, 7, 8 and 10 are quite distant to screw holes. According to the pressure conditions at these points, for most of them, an increased coating thickness has been chosen. The difference between the different coating thicknesses amounts to about 10 μm. In contrast to these points considered for their difference, points 11 to 14 have been measured in order to verify the difference in height of a coating in an area where no deliberate variation has been introduced. They show an average height of 27.1 μm with a standard deviation of 0.5 μm. This underlines that the $1^{st}$ decimal place must be ignored due to production and measurement uncertainty. The polymer-based coating (103) in the non-compressed state in the first partial region shows a thickness that is smaller, such as smaller by at least 40%, in particularly by 30%, than the thickness of the coating in the second partial region.

Figure 4:
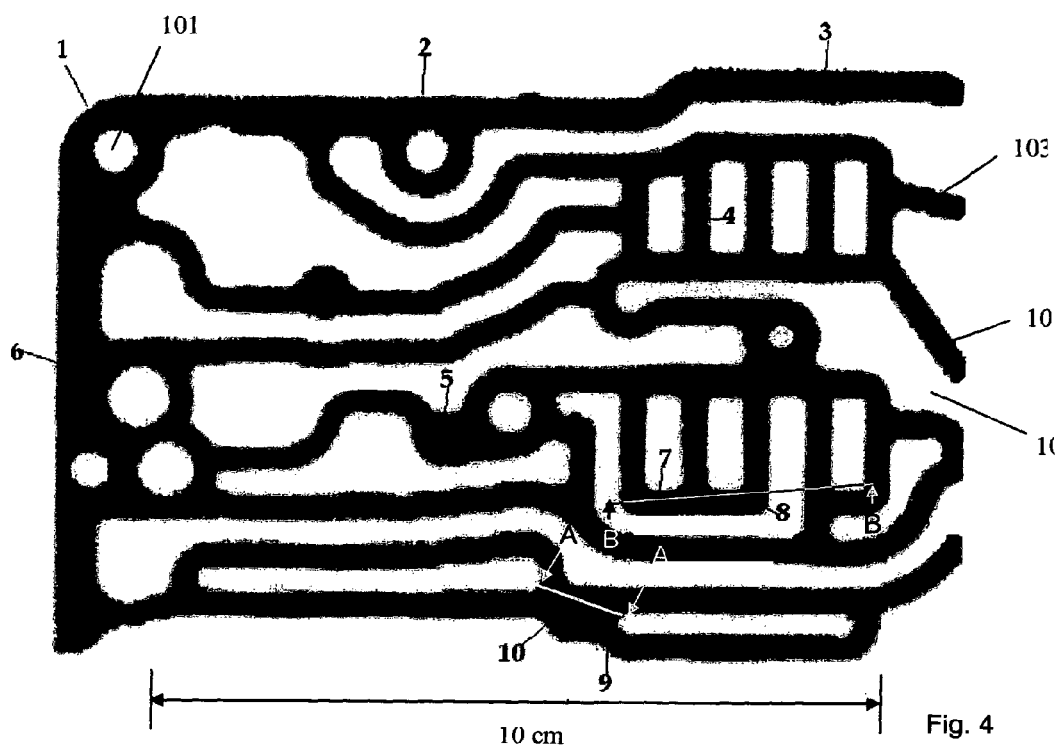
FIG. 4: A detail of a top-view of a coating of a control plate.

FIG. 4 shows a further detail of a top-view of a coating pattern of a transmission control plate 100. The coating shown here is entirely continuous and is produced in a single coating step.

The coating thicknesses shown in the following table, which are each measured in the middle of the coating lip, have been designed according to the pressure conditions which are given around and between the screw holes 101 in the compressed state:

Table of values relating to FIG. 4

| Measurement point | actual value [μm] |
|---|---|
| 1 | 12 |
| 2 | 12 |
| 3 | 20 |
| 4 | 34 |
| 5 | 14 |
| 6 | 12 |
| 7 | 24 |
| 8 | 36 |
| 9 | 27 |
| 10 | 17 |

In particular at the measurement points 4, 8 and 9 which are each remote from the screw holes, the coating has been applied with a high thickness. The distance from the screw holes is however not the only factor that is considered when designing the coating height. Rather, the individual pressure conditions are to be considered. This is for instance obvious from the considerably different coating thicknesses at the closely neighboring points 9 and 10.

Figure 5:
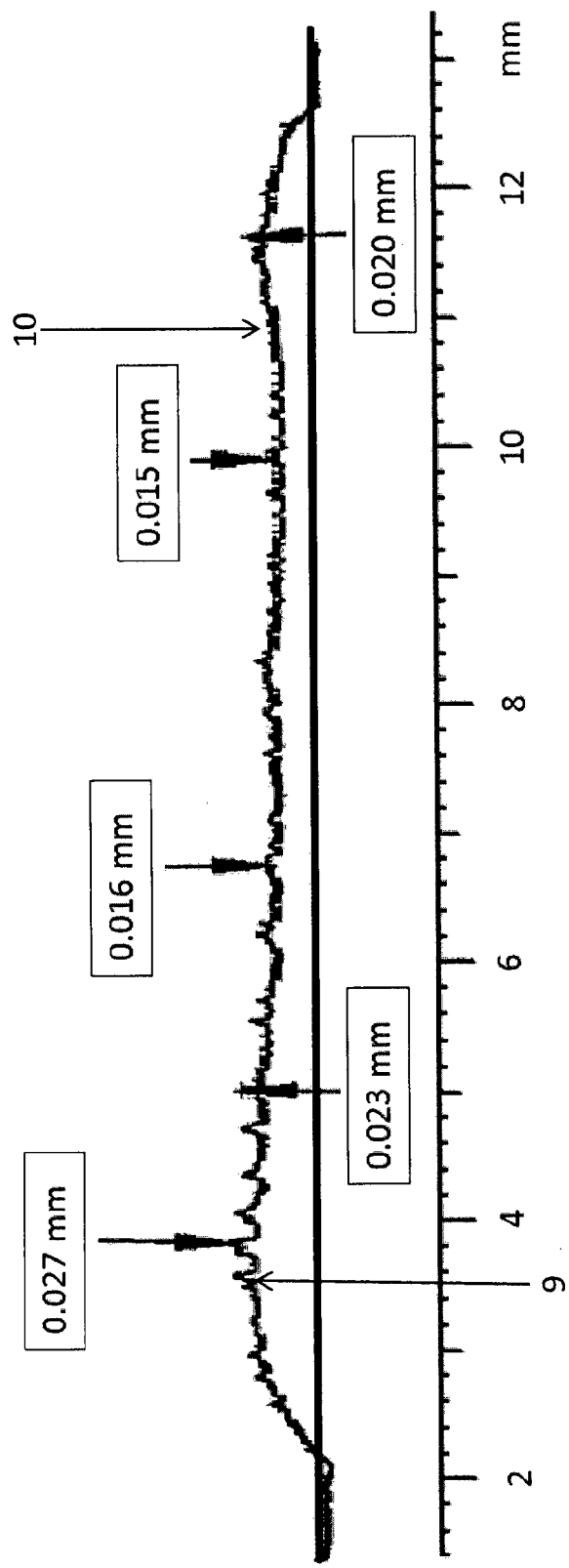
FIGS. 5 and 6: The course of the thickness of a coating along the sections A-A and B-B in FIG. 4.

FIG. 5 illustrates the course of the thickness of the coating along the section A-A in FIG. 4. On the left side of FIG. 5, point 10 is shown and on the right side of Figure, one can see point 9. It is obvious that in the middle area of the coating, its height varies between 15 μm and 27 μm. FIG. 4 also underlines, that measurement points 9 and 10 are both distanced by more than 0.8 mm from the outer edge of the coating area.

Figure 6:
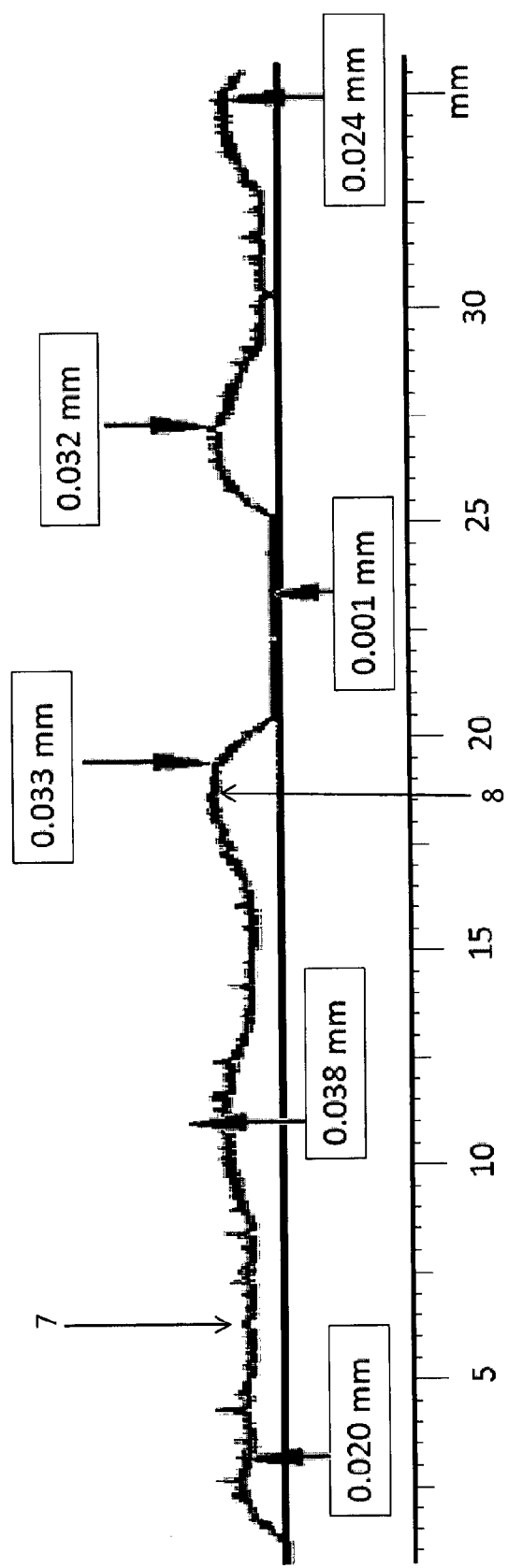

FIG. 6 shows a section along line B-B in FIG. 4 and comprises the measurement points 7 and 8. The thickness of the coating varies along this line, too. It actually varies between 20 μm and 33 μm in the central area of the coating. As already mentioned above, the edge area of the coating which bottoms out to a thickness of 0 μm is not considered in the present invention.

Figure 7:
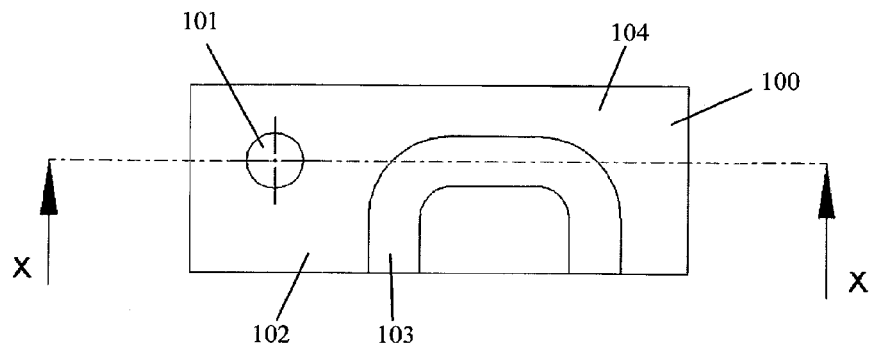
FIG. 7: A detail of a control plate.
Figure 8:
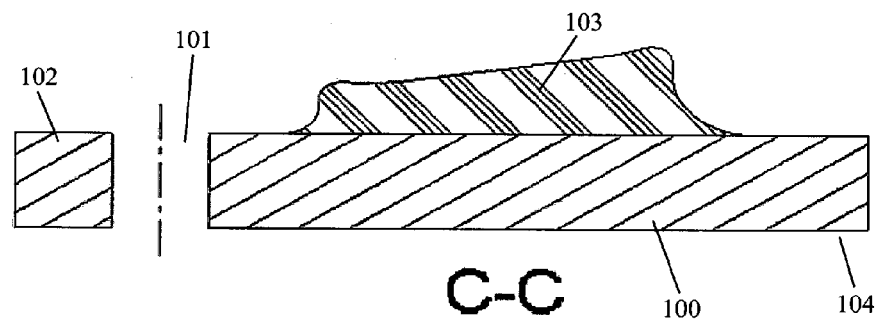
FIGS. 8 to 10: Details of cross-sections of a control plate.
Figure 9:
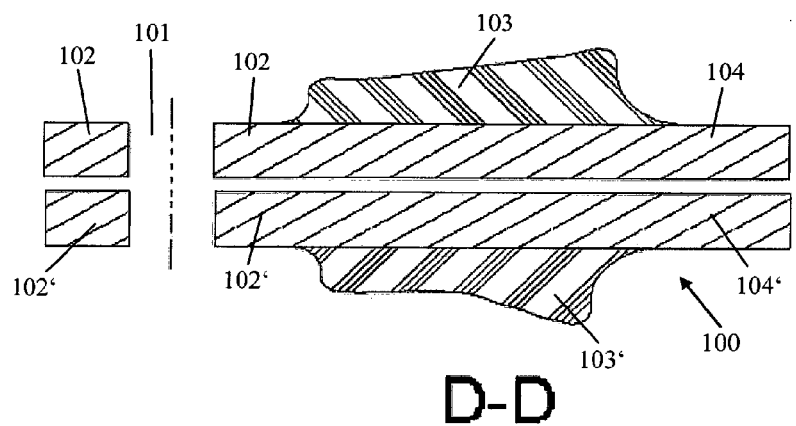
Figure 10:
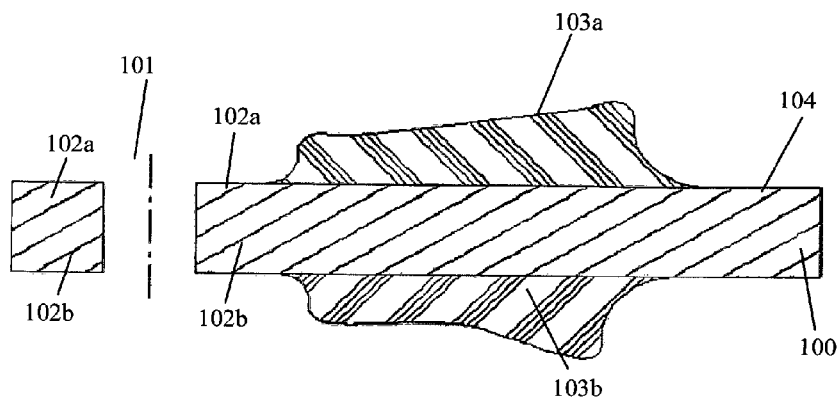

FIG. 7 shows a detail of a top-view of a control plate 100 in a schematic representation. The control plate comprises one metallic layer 104. A screw hole 101 is cut into this metallic layer 104. There is a coated area 103 in the vicinity of the screw hole 101, which is however distant to the screw hole 101 by a non-coated area 102. As the coating, a fluoro-rubber has been used here. FIGS. 8, 9 and 10 show cross-sections along line X-X in FIG. 7 for different control plates.

In FIG. 8, a one-layered control plate 100 is illustrated which comprises one metallic layer 104 only. In the coating 103, the coating increases in a radial direction with increasing distance to the screw hole 101.

FIG. 9 shows a two-layered control plate 100 with a first metallic layer 104 and a second metallic layer 104'. In both layers, the respective surfaces pointing outwardly are coated with an elastomeric coating 103 and 103', respectively. The thickness of the elastomeric coatings 103 and 103' increases with an increasing distance from the screw hole 101.

FIG. 10 again shows a one-layered control plate 100 with a metallic layer 104. In contrast to FIG. 8, this metallic layer 104 now is coated on both its surfaces with an elastomeric coating 103a, 103b. The thickness of both coatings 103a, 103b increases with an increasing distance from the screw hole. 101.

FIGS. 8 to 10 indicate that the coating thickness towards the lateral edge of a sealing lip does not steadily reduce its thickness. Rather, there is an inner edge region in which the coating thickness slightly increases compared to the centre region of the sealing lip. Adjacent to this inner region, there is a steep decline of the coating profile, which then passes into the outer edge region where the coating phases out.

Figure 11:
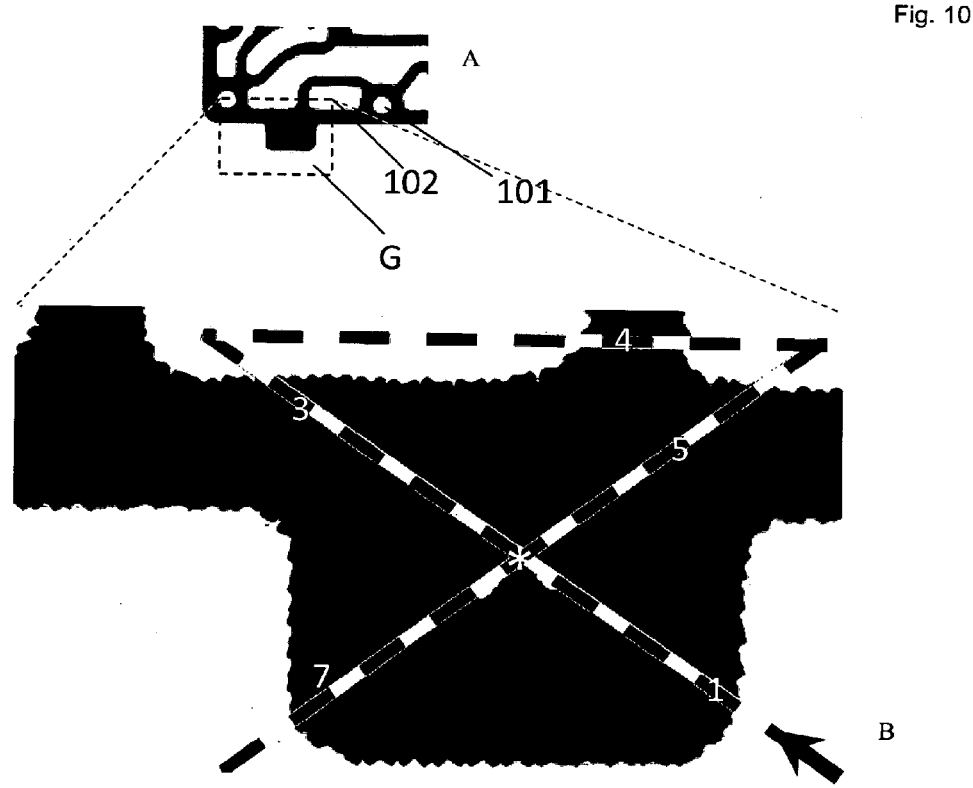
FIG. 11: A top view and a corresponding detail of a coating of a control plate.

FIG. 11 in the top view of FIG. 11A and the respective detail shown in FIG. 118 concentrates on a small region close to the outer edge of the transmission plate in order to show that the width of the coating line or sealing lip has a considerable influence on the height of the coating. In this edge region, no deliberate variation of the coating height has been made during the application. However, as shows the following table, one can observe quite different coating heights in this small area. The arrow indicates the measurement direction that was used when measuring with the 3-dimensional microscope. The asterisk represents both measurement point 2 and 6, as the height at this point has been measured each time the point was passed.

Table of values relating to FIG. 11

| Measurement point | actual value [μm] |
|---|---|
| 1 | 25 |
| 2 | 18 |
| 3 | 22 |
| 4 | 30 |
| 5 | 19 |
| 6 | 18 |
| 7 | 23 |

Three groups of measurement heights can be identified. On the one hand, three points at the edge of the large coating area in the middle of the detail G considered. They show heights of 22 to 25 μm. On the other hand, three points closer to the center of the large coating area with a coating height of 18 or 19 μm. This corresponds with what has already been observed in the context of FIGS. 8 to 10: For sufficiently broad coating lines, the coating tends to show its maximum height not at its center but at the inner edge region. When the coating is applied with screen printing, a liquid with an extremely low viscosity is applied to the surface of the gasket layer. The edge regions show a higher drying velocity than the center area as at the edge, the lateral surface allows the solvent to diffuse, too. As a consequence, the shape of the edge regions is already fixed and the skin of the coating in this region has already become quite definitive while the center region has not completely dried. In the subsequent drying phase, the skin in the center region is still very flexible while the solvent left over diffuses. As a consequence, the volume of the coating in this center area is reduced further and the height sinks. The skin still shows sufficient flexibility in order to follow this process. The same effect results from crosslinking if a thermoset or elastomeric coating is applied, thus the overall effect is increased.

Further, one can identify an extremely high coating at point 4, at the center of a small coating line that branches off the large coating area in the middle of the detail G considered. This is in line with the aforementioned, as here the sealing line is so small that no sinking of the coating at its center takes place, so that the coating has an identical height over almost its entire width apart from the outer edge region described above.

This underlines that the deliberately introduced topography within a continuous coating line should only be established in the central area of the coating area and that only such areas should be compared that show a similar coating width.

The invention claimed is:

1. A transmission control plate, comprising:
   a single metallic layer with a first side and an opposite second side;
   a first pattern of a polymer-based coating on said first side and a second, different pattern of said polymer-based coating on said second side, wherein each of said coatings is only a single layer each with their own uniform material construction;
   wherein each polymer-based coating increases in a radial direction with increasing distance from a passage opening for a fastener element in said single metallic layer;
   wherein said first pattern overlaps said second pattern on some plate areas but the two patterns do not overlap in other plate areas.

2. The transmission control plate of claim 1, wherein the coating in two different areas on said single metallic layer shows an identical or an almost identical width.

3. The transmission control plate of claim 1, wherein a thicknesses of the coating at the two different areas is different by at the most 10% of a width of the broader coating area or of a width of both coating areas.

4. The transmission control plate of claim 1, wherein the metallic layer apart from the polymer-based coating applied to the surface of the metallic layer as a seal comprises no further seal including neither embossed beads nor profilings formed into the metallic layer.

5. The transmission control plate of claim 1, wherein a continuous variation of a thickness of the polymer-based coating between two areas of different thickness within a continuously coated region is provided.

6. The transmission control plate of claim 1, wherein a thickness is the height of the coating along a section through a central area of a continuously coated region, said central area having a distance of at least ≥30% of a minimum width of the polymer-based coating or of at least 0.8 mm towards adjacent edges of the polymer-based coating.

7. The transmission control plate of claim 1, wherein a continuously coated region shows a variation of the thickness of the polymer-based coating by ≥12 μm on a distance of ≤20 mm.

8. The transmission control plate of claim 1, wherein a continuously coated region shows a variation of the thickness of the polymer-based coating by ≥15 μm on a distance of ≤50 mm.

9. The transmission control plate of claim 1, wherein a continuously coated region comprises a first partial region adjacent to the passage opening and a second partial region with a larger distance to the passage opening, where the second partial region shows no passage openings for fastening elements, where the polymer-based coating in the non-compressed state in the first partial region shows a thickness that is smaller than a thickness of the coating in the second partial region.

10. The transmission control plate of claim 9, wherein the second partial region is distanced from any passage opening for a fastener element by at least one diameter of the respective passage opening.

11. The transmission control plate of claim 9, wherein the polymer-based coating in the non-compressed state in the first partial region shows a thickness that is smaller by at least 50% than the thickness of the coating in the second partial region.

12. The transmission control plate of claim 1, wherein the at least one surface of the metallic layer which surface extends parallel to the plane of the layer and is coated with the polymer-based coating is completely flat and shows neither local protrusions nor local depressions.

13. The transmission control plate of claim 1, wherein the metallic layer has a sheet thickness of at least 0.5 mm and at the most 1.2 mm.

14. The transmission control plate of claim 1, wherein the metallic layer is partially or completely coated on both of its surfaces, wherein the two coatings in a projection in a common plane coincide only in sections.

15. The transmission control plate of claim 1, wherein the polymer-based coating is only a single layer coating.

16. The transmission control plate of claim 1, wherein the polymer-based coating is a single layer of ≥10 μm thickness.

* * * * *